(12) United States Patent
Pafumi et al.

(10) Patent No.: US 8,726,274 B2
(45) Date of Patent: *May 13, 2014

(54) REGISTRATION AND INITIALIZATION OF CLUSTER-AWARE VIRTUAL INPUT/OUTPUT SERVER NODES

(75) Inventors: James A. Pafumi, Leander, TX (US);
Jacob J. Rosales, Austin, TX (US);
Morgan J. Rosas, Cedar Park, TX (US);
Vasu Vallabhaneni, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 578 days.

This patent is subject to a terminal disclaimer.

(21) Appl. No.: 12/880,044

(22) Filed: Sep. 10, 2010

(65) Prior Publication Data

US 2012/0066678 A1 Mar. 15, 2012

(51) Int. Cl.
*G06F 9/455* (2006.01)
*G06F 15/177* (2006.01)

(52) U.S. Cl.
USPC .............................. 718/1; 709/220; 709/223

(58) Field of Classification Search
None
See application file for complete search history.

(56) References Cited

U.S. PATENT DOCUMENTS

| | | | |
|---|---|---|---|
| 5,999,712 A * | 12/1999 | Moiin et al. | 709/220 |
| 7,039,694 B2 * | 5/2006 | Kampe et al. | 709/222 |
| 7,143,250 B1 | 11/2006 | Riedl | |
| 7,392,421 B1 | 6/2008 | Bloomstein | |
| 7,437,448 B1 | 10/2008 | Kohler et al. | |
| 7,457,722 B1 | 11/2008 | Shain | |
| 7,568,052 B1 | 7/2009 | Cwiakala et al. | |
| 7,577,865 B2 | 8/2009 | Nguyen | |
| 7,631,066 B1 | 12/2009 | Schatz | |
| 7,840,833 B2 * | 11/2010 | Tripathi et al. | 714/4.1 |
| 7,844,757 B2 | 11/2010 | Mani et al. | |
| 7,886,186 B2 | 2/2011 | Kumagai | |
| 8,019,966 B2 | 9/2011 | Nevarez et al. | |
| 8,028,147 B2 | 9/2011 | Nevarez et al. | |
| 8,041,877 B2 | 10/2011 | Nevarez et al. | |
| 8,099,522 B2 | 1/2012 | Anderson et al. | |
| 8,145,871 B2 | 3/2012 | Pafumi et al. | |

(Continued)

OTHER PUBLICATIONS

U.S. Appl. No. 12/879,978 entitled "Autonomous Propagation of Virtual Input/Output (VIO) Operation(s) to Second VIO Server (VIOS) Due to a Detected Error Condition at a First VIOS"; Non-final office action dated Oct. 22, 2012.

(Continued)

*Primary Examiner* — Abdullah Al Kawsar
*Assistant Examiner* — Benjamin Wu
(74) *Attorney, Agent, or Firm* — Yudell Isidore Ng Russell PLLC

(57) ABSTRACT

In a data processing system having a plurality of virtualized operating system (OS) partitions, a first cluster-aware virtual input/output server (VIOS) is provided within an OS partition by execution of a cluster-aware (CA) OS on a virtual processor resource of the first VIOS. The CA OS establishes the VIOS as a cluster-aware VIOS by registering the first VIOS with a VIOS cluster comprising a second VIOS. Registering the first VIOS to the VIOS cluster enables the first VIOS to receive VIOS cluster configuration data and status data, which provides the first VIOS with information about the other VIOSes within the VIOS cluster. The first VIOS is thus able to communicate with other VIOSes within the VIOS cluster and share I/O resources with the other VIOSes within the VIOS cluster. Relevant cluster information is stored within a local storage of the first VIOS.

25 Claims, 9 Drawing Sheets

(56) References Cited

U.S. PATENT DOCUMENTS

| | | |
|---|---|---|
| 8,392,378 B2* | 3/2013 | Pafumi et al. .................. 707/679 |
| 8,458,413 B2* | 6/2013 | Ganti et al. .................... 711/153 |
| 8,473,692 B2* | 6/2013 | Rosales et al. ................. 711/153 |
| 8,495,412 B2* | 7/2013 | Pafumi et al. ................... 714/4.1 |
| 8,521,703 B2* | 8/2013 | Mewhinney et al. .......... 707/692 |
| 8,533,164 B2* | 9/2013 | Pafumi et al. .................. 707/679 |
| 8,560,628 B2* | 10/2013 | Ganti et al. .................... 709/213 |
| 2003/0204509 A1* | 10/2003 | Dinker et al. .................. 707/100 |
| 2003/0204626 A1* | 10/2003 | Wheeler ........................ 709/245 |
| 2004/0003141 A1 | 1/2004 | Matters et al. |
| 2004/0204148 A1 | 10/2004 | Sudo |
| 2004/0215735 A1* | 10/2004 | Nakahara et al. ............. 709/207 |
| 2005/0027796 A1* | 2/2005 | San Andres et al. .......... 709/203 |
| 2005/0160413 A1* | 7/2005 | Broussard et al. ............ 717/148 |
| 2005/0160424 A1* | 7/2005 | Broussard et al. ................ 718/1 |
| 2005/0268154 A1* | 12/2005 | Wipfel et al. ..................... 714/4 |
| 2005/0273645 A1* | 12/2005 | Satran et al. ...................... 714/4 |
| 2006/0155981 A1* | 7/2006 | Mizutani et al. .............. 713/150 |
| 2006/0200488 A1* | 9/2006 | Chu-Carroll et al. ......... 707/102 |
| 2006/0288096 A1* | 12/2006 | Yim ............................... 709/224 |
| 2008/0126579 A1* | 5/2008 | Corneli et al. .................... 710/5 |
| 2008/0244306 A1 | 10/2008 | Kumagai |
| 2009/0037941 A1* | 2/2009 | Armstrong et al. ........... 719/328 |
| 2009/0113034 A1* | 4/2009 | Krishnappa et al. .......... 709/223 |
| 2009/0150534 A1 | 6/2009 | Miller et al. |
| 2009/0177914 A1* | 7/2009 | Winchell .......................... 714/4 |
| 2009/0193414 A1* | 7/2009 | Broussard et al. ................ 718/1 |
| 2009/0307460 A1 | 12/2009 | Nevarez et al. |
| 2009/0313401 A1 | 12/2009 | Mani et al. |
| 2010/0122111 A1 | 5/2010 | Allen et al. |
| 2012/0110274 A1 | 5/2012 | Rosales et al. |
| 2012/0150805 A1* | 6/2012 | Pafumi et al. .................. 707/640 |
| 2012/0150985 A1* | 6/2012 | Marion et al. ................. 709/207 |
| 2012/0151265 A1* | 6/2012 | Bender et al. ................... 714/37 |
| 2012/0179798 A1* | 7/2012 | Pafumi et al. .................. 709/223 |
| 2012/0179837 A1* | 7/2012 | Bender et al. ................. 709/238 |
| 2012/0180070 A1* | 7/2012 | Pafumi et al. .................. 719/313 |
| 2012/0246517 A1* | 9/2012 | Bender et al. ................... 714/45 |
| 2013/0013569 A1* | 1/2013 | Pafumi et al. .................. 707/679 |
| 2013/0024718 A1* | 1/2013 | Mewhinney et al. ............. 714/2 |
| 2013/0031341 A1* | 1/2013 | Ganti et al. ........................ 713/2 |
| 2013/0254165 A1* | 9/2013 | Pafumi et al. .................. 707/652 |

OTHER PUBLICATIONS

U.S. Appl. No. 12/879,978 entitled "Autonomous Propagation of Virtual Input/Output (VIO) Operation(s) to Second VIO Server (VIOS) Due to a Detected Error Condition at a First VIOS"; Notice of Allowance dated Mar. 25, 2013.

U.S. Appl. No. 13/004,139 entitled "Single Point, Scalable Data Synchronization for Management of a Virtual Input/Output Server Cluster"; Non-final office action dated Oct. 10, 2013 (17 pg).

* cited by examiner

REGISTRATION AND INITIALIZATION OF CLUSTER-AWARE VIRTUAL INPUT/OUTPUT SERVER NODES

CROSS REFERENCED APPLICATIONS

The present application is related to the subject matter of the following commonly-assigned, co-pending patent applications, filed on even date herewith: U.S. Ser. No. 12/879,978, titled "Autonomous Propagation of Virtual Input/Output (VIO) Operation(s) to A Second VIO Server Due to A Detected Error Condition at a First VIOS" The entire content of the related application is incorporated herein by reference.

BACKGROUND

1. Technical Field

The present invention relates in general to distributed data processing systems and in particular to distributed data processing systems with cluster-aware virtual input/output servers (VIOSes). Still more particularly, the present invention relates to a method, data processing system and computer program product that implements cluster-awareness within a VIOS cluster.

2. Description of the Related Art

Virtualized data processing system configuration, which provides the virtualization of processor, memory and Operating System (OS) resources are becoming more and more common in the computer (and particularly the computer server) industry. To a lesser extent, storage virtualization is also known and provided in limited environments. However, within the virtualization computing environment, storage virtualization and management is implemented as a separate virtualization model from server virtualization and management. Thus, different client logical partitions (LPARs) associated with different virtualized server systems may access the same storage access network (SAN) storage. However, the client LPARs on one server do not have any "knowledge" of whether the SAN disk that the client LPAR is trying to access is being used by some other client LPAR belonging to the same server or another server. The conventional implementation of distributed server systems providing storage virtualization within shared SAN storage can cause data integrity issues and may potentially cause data corruption and client partition crashes.

BRIEF SUMMARY

Disclosed are a method, data processing system, and a computer program product that establishes cluster-awareness for a Virtual Input/Output (I/O) Server (VIOS) created within an operating system (OS) partition of a computing electronic complex within the data processing system. One embodiment provides a computing electronic complex (CEC) comprising: a processor; one or more physical input/output (I/O) adapters that support I/O communication with an external network; and a memory coupled to the one or more processors and having a virtualization management component that supports creation of and communication between one or more virtualized operating system (OS) partitions. The memory also includes at least one operating system (OS) partition, including a first virtual input/output (I/O) server (VIOS) partition having a cluster-aware (CA) OS that executes on a virtual processor resource of the VIOS. When executed the CA_OS performs the function of registering the first VIOS with a VIOS cluster comprising at least a second VIOS. The registering of the first VIOS to the VIOS cluster enables the first VIOS to receive cluster specific data to make the first VIOS aware of the VIOS cluster, and the first VIOS is thus able to communicate information with other VIOSes within the VIOS cluster.

According to one embodiment, registering of the first VIOS with the VIOS cluster comprises: initializing a cluster registration module that assigns the VIOS with a unique ID and forwards VIOS registration data to a shared VIOS database (DB); receiving, from the shared VIOS DB, cluster configuration data and status data of the VIOS cluster for local storage at the first VIOS; and updating a local storage of the first VIOS with the received cluster configuration data and status data.

In one embodiment, the CA_OS further performs the functions of: initializing an I/O emulation module of the CA_OS to enable the VIOS to provide virtual I/O (VIO) services to one or more client logical partitions (LPARs) existing within one of the OS partitions; registering a first client LPAR with the VIOS; assigning a unique VIO adapter to the client LPAR; and enabling I/O operations for the client LPAR by linking the unique VIO adapter to one of the one or more physical I/O adapters.

In at least one embodiment, the CA_OS comprises a cluster management (CM) utility that executes on the virtual processor resource to provide the functions of: registering the first VIOS with the VIOS DB for receipt of one or more notifications of one or more events that may occur n the VIOS cluster; receiving events data from within the VIOS cluster; and updating the local storage of the first VIOS with relevant cluster information for the first VIOS. Additionally, in one embodiment, the CM utility further provides the function of coordinating a primary node election process with one or more other VIOSes within the CIOS cluster to elect a primary node from among the VIOSes within the VIOS cluster. The primary node elected performs one or more primary node functions of the VIOS cluster.

In yet another embodiment, the CM management utility provides the functions of: providing I/O redundancy within the VIOS cluster by enabling the first VIOS to perform the functions of: receiving an I/O request from the client LPAR; detecting that a problem exists with a fabric connection to the block storage; autonomously propagating the I/O request to a second VIOS to which the first VIOS is connected within the VIOS cluster, wherein forwarding of the I/O request to the block storage is completed by the second VIOS; and in response to receiving an I/O response from the second VIOS: associating the I/O response to the I/O request that was propagated to the second VIOS; and forwarding the I/O response to the client LPAR of the first VIOS.

According to one or more embodiments, the CA_OS further provides the functions of generating a software stack within the VIOS to enable the VIOS to communicate with components external to the VIOS via an application programming interface. In one embodiment, where the VIOS is a first VIOS registering within the VIOS cluster, the CA OS further provides the function of creating the VIOS cluster with the first VIOS and one or more second VIOSes located within the CEC, where each VIOS within the VIOS cluster are communicatively coupled to each other VIOS within the VIOS cluster and have access to a shared VIOS database. Additionally, the CA_OS further provides the function of enabling the first VIOS to provide VIO connectivity to a physical fabric connecting the first VIOS to block storage that is accessible by all VIOSes within the VIOS cluster.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1A:
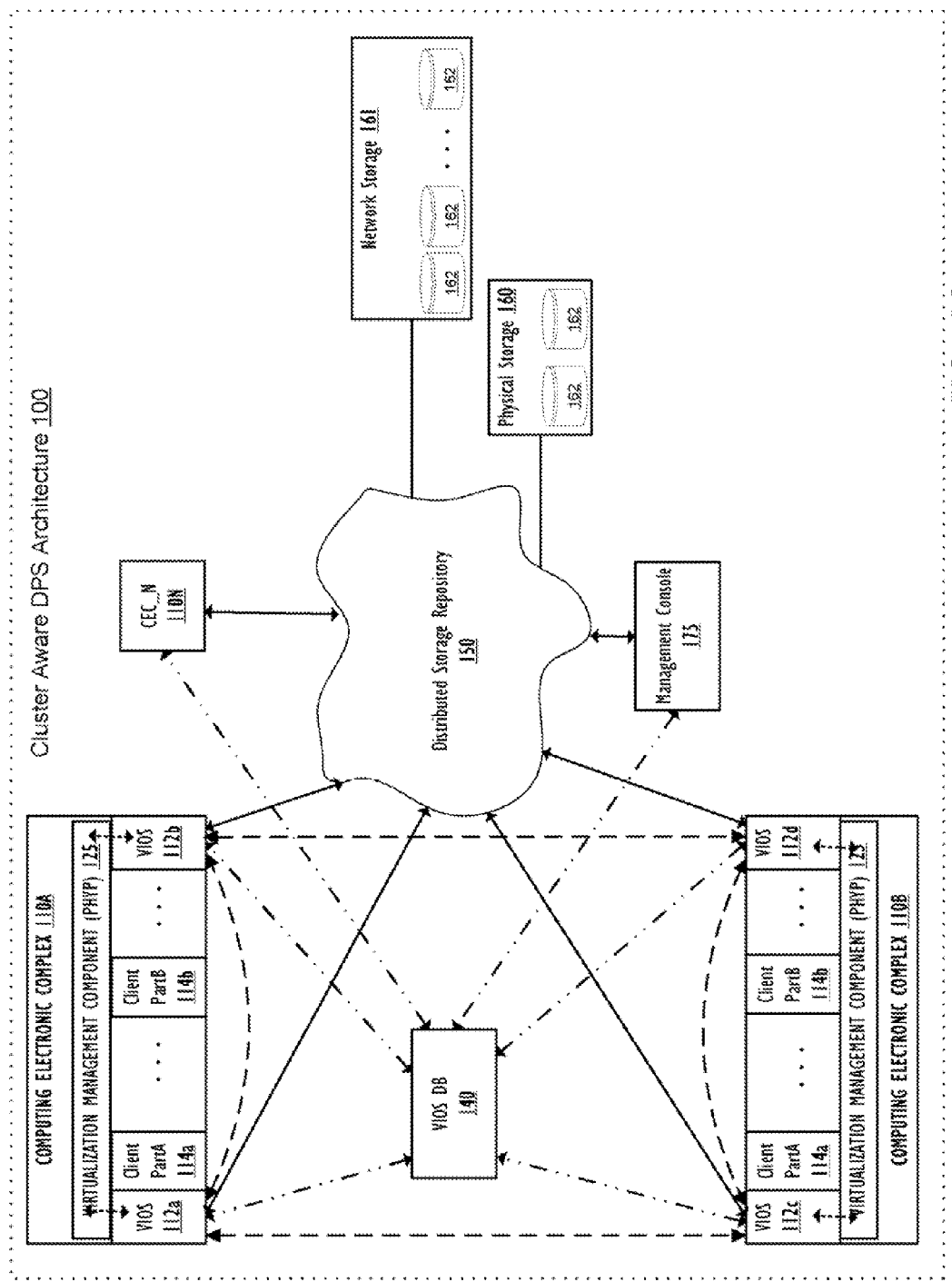
FIG. 1A illustrates a first view of a cluster (aware) data processing system within which various of the functional features of the described embodiments are implemented, according to one embodiment.

The illustrative embodiments provide a method, data processing system, and computer program product that establishes cluster-awareness for a Virtual Input/Output (I/O) Server (VIOS) created within an operating system (OS) partition of a computing electronic complex within the data processing system. A first cluster-aware (VIOS) is provided within an OS partition by execution of a cluster-aware (CA) OS on a virtual processor resource of the first VIOS. The CA OS establishes the VIOS as a cluster-aware VIOS by registering the first VIOS with a VIOS cluster comprising a second VIOS. Registering the first VIOS to the VIOS cluster enables the first VIOS to receive VIOS cluster configuration data and status data, which provides the first VIOS with information about the other VIOSes within the VIOS cluster. The first VIOS is thus able to communicate with other VIOSes within the VIOS cluster and share I/O resources with the other VIOSes within the VIOS cluster. Relevant cluster information is stored within a local storage of the first VIOS.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and subheadings are presented within the specification:

A. General Architecture
B. Cluster-Aware VIOS
C. VIOS API Communication Infrastructure
D. VIOS Shared DB for Cluster Management
E. Autonomous Propagation of Virtual IO to Second VIOS Due to Fabric Loss
F. VIOS Creation and Registration with VIOS Cluster A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks. solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 1B:
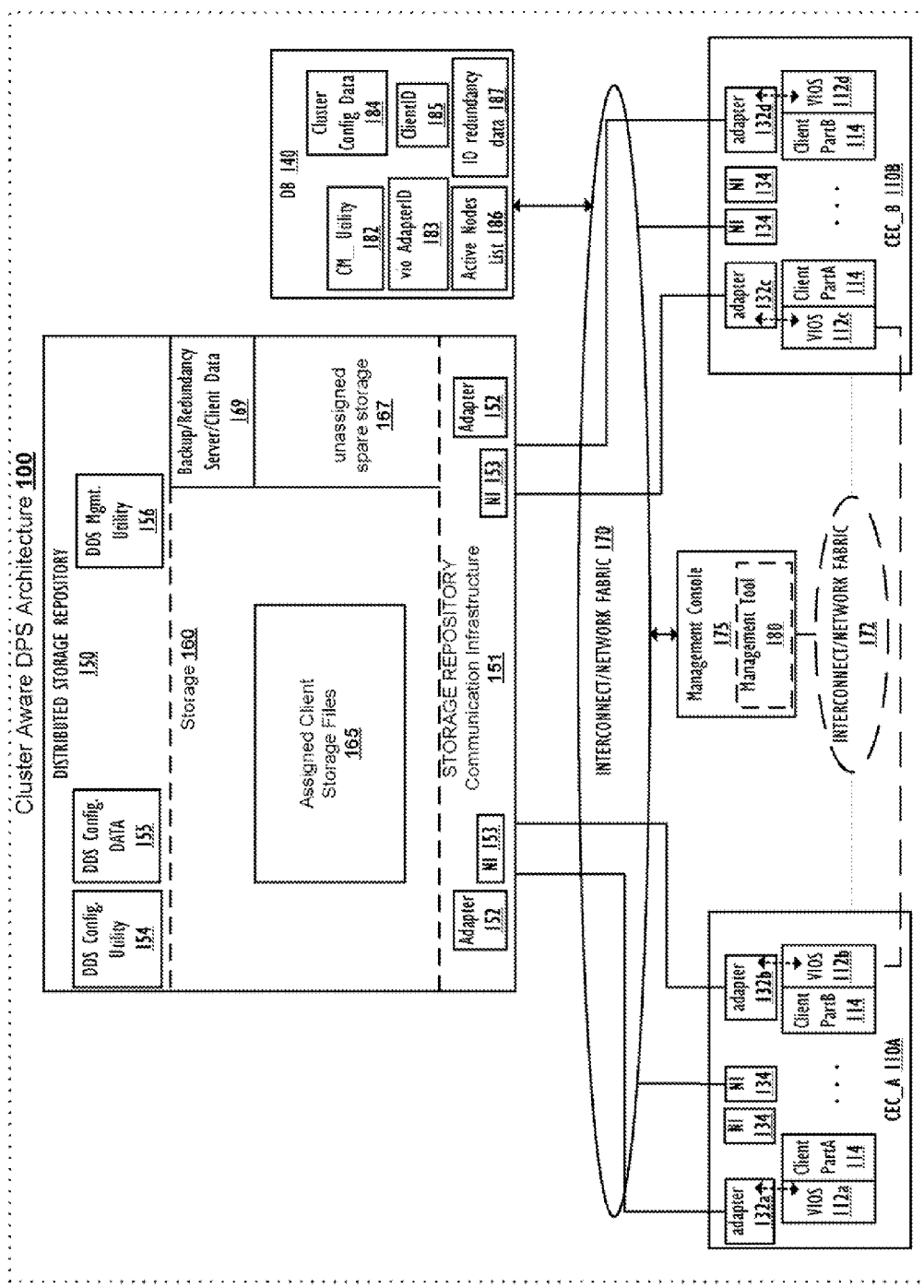
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Also illustrated by FIG. 1B is an initial view of the component make-up of an example distributed storage repository 150 and an initial listing of some components of DB 140. As depicted, each CEC 110 comprises one or more network interfaces 134 and one or more I/O adapters 132 to enable the CEC 110 and thus the other components (i.e., client partitions) of the CEC 110 to engage in network level communication, as described below. Specifically, each VIOS 112 emulates virtual client I/O adapters to enable communication by the client LPARs 114 with distributed storage repository 150 and/or other clients, within the same CEC or on a different CEC. The VIOSes 112 emulate virtual I/O adapters and communicates with distributed storage repository 150 by connecting with corresponding virtual sever I/O adapters at distributed storage repository 150. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (132) that are assigned to clients 114 of CECs 110.

As shown with FIG. 1B, distributed storage repository (DSR) 150 also comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, distributed storage repository 150 also comprises VIOS database (DB) 140, in which is stored various data structures generated during set up and/or subsequent processing of the VIOS cluster-connected processing components (e.g., VIOSes and management tool). DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. Additional features of DB 140 and distributed storage repository 150 as well as the specific components or sub-components that enable the various clustering functionality are presented within the description of the remaining figures and throughout the description of the various embodiments.

These various data structures are created, maintained and/or updated, and/or deleted by the various operations of one or more of the processing components. In one embodiment, the initial set up of the storage pools, VIOS DB 240 and corresponding data structures is activated by execution of a cluster aware operating system by management tool 180. Once the infrastructure has been established, however, maintenance of the infrastructure, including expanding the number of nodes, where required, is performed by the VIOSes in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls the operations of the cluster and enables each node within the cluster to maintain current/updated information regarding the cluster, including providing notification of any changes made to one or more of the nodes within the cluster.

Figure 2:
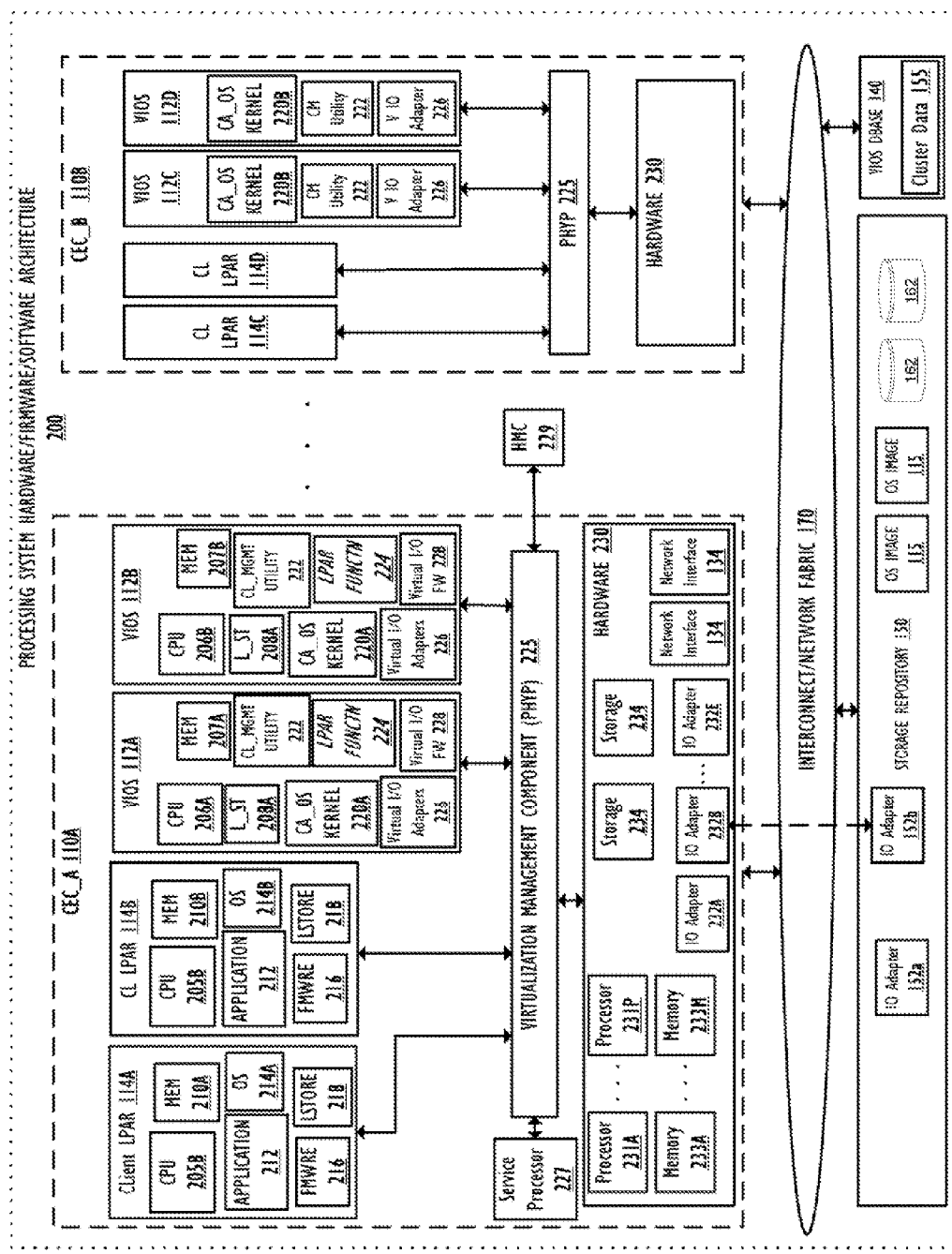
FIG. 2 illustrates an internal configuration of a computing electronic complex (CEC) within the cluster DPS having virtualized OS partitions, including virtual I/O server (VIOS) partitions, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports Virtual real memory and Virtual shared storage functionality (with access to Distributed storage repository 150) as well as clustering functionality.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS 112 will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking. These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In the described embodiments, CA_OS 220 comprises cluster management (CM) utility 222 which supports the configuration of the VIOS to enable cluster-awareness and cluster-level functionality, such as redundant virtual I/O. Each of these additional software components of CA_OS 220 may be a functional module within CM utility, in one embodiment, and each module is thus described as such throughout the remainder of this specification. In one embodiment, CM utility 222 may be a separate utility that is locally installed or downloaded (from DB 140, for example) as an enhancement to an existing OS within a CEC 110 or VIOS 112, when initially configured for operation within the VIOS cluster. CM utility 222 is then executed when configuring the individual VIOS to create or join a cluster and/or become a cluster-aware node within the VIOS cluster. With this implementation structure, CM utility 222 enables the OS to support the various cluster-awareness and other cluster-level features and functionality. In an alternate embodiment, CA_OS 220 includes all the clustering features and functionality and established the various features when the CEC 110/VIOS 112 joins the cluster and/or during configuration of VIOS 112 to become cluster-aware.

In one implementation, functional components of CM utility 222 are encoded on local device storage of a corresponding VIOS 112, such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B and FIG. 2 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms may be utilized interchangeably throughout the specification.

As further presented by the illustrative embodiments (e.g., FIG. 2A), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2A, a first VIOS 112a (through a communication channel established via PHYP 225), grants access to another VIOS 112b through one or more virtual adapters. VIOS 112 includes the functionality to query PHYP 225 for the identity of the Client LPAR 114 on the CEC 110 where the VIOS 112 is currently running.

With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

Figure 3:
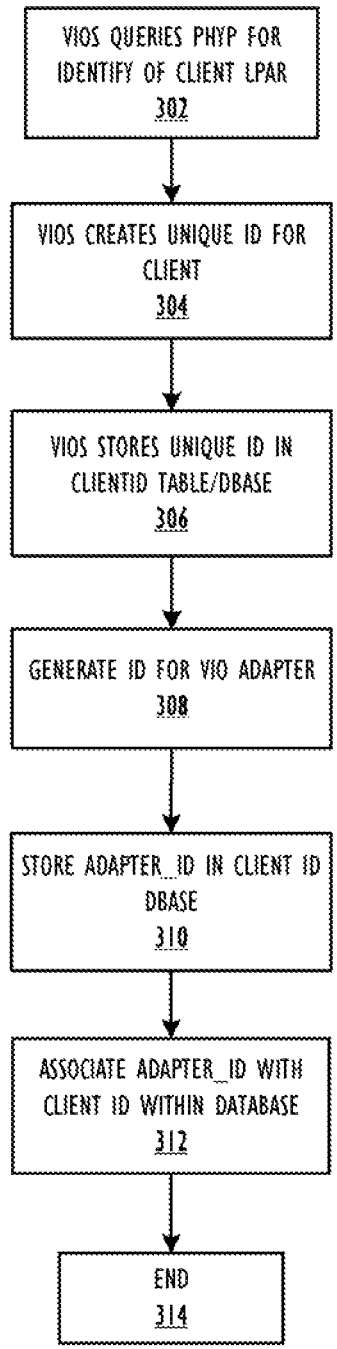
FIG. 3 is a flow chart of the method by which the process of client creation and registration is completed within a CA_DPS, according to one embodiment.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client. FIG. 3 is a flow chart illustrating the method by which a VIOS 112 on a CEC 110 with DPS 100 enables cluster level communication between a client LPAR 114 and distributed storage repository 150, according to one embodiment. The process begins at block 302 at which the VIOS 112 queries PHYP 225 for the identity of the client LPAR 114. At block 304, the VIOS 112 creates a unique identifier (ID) for the client (i.e., a ClientID). The VIOS 112 then stores the unique ClientID in ClientID data structure 159 (FIG. 1B) within DB 140 (block 306). The DB 140 and by extension the ClientID data structure 159 are accessible to each VIOS partition in the cooperating cluster (DPS 100). At block 308, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapaterID data structure 158 (block 310) and are associated with their corresponding clientIDs (block 312). The method illustrated by FIG. 3 ends at termination block 314, with each clientID having been associated with the corresponding one or more vio AdapterIDs with DB 140.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. CA VIOS Communication Protocol

One embodiment provides a communication protocol that enables efficient communication between the Clients 114 and distributed storage repository 150 via the respective VIOS 112 and virtual I/O adapters assigned within the VIOSes 112 to the specific client 114. The embodiment further provides storage virtualization and management via the specific communication mechanisms/protocols implemented with respect to the use of cluster awareness and the Distributed storage repository 150 such that the virtualization is presented within the context of the server (CEC 110) virtualization and management. With the presented protocol, different VIOSes 112 associated with different CECs 110 access the same single distributed DB 140 and cluster-level information is shared/communicated with each Client I/O process such that a first client on a first CEC is aware of which SAN disk resources are being accessed by a second client on a second CEC (or on the same CEC). With this awareness factored into the I/O exchange with the distributed storage repository 150, the first client can avoid accessing the same storage resource that is concurrently being utilized by the second client, thus preventing data integrity issues, which would potentially cause data corruption and client partition crashes.

The communication protocol provides a highly integrated server-based storage virtualization, as well as distributed storage across clustered VIOS partitions. This protocol comprises one or more query features, which enables dynamic tracking of storage resource usage across the entire cluster. Throughout the following description, the communication and management protocol shall be described as a VIOS protocol. VIOS protocol provides distributed storage across clustered VIOS partitions. With the VIOS protocol, the storage is considered as a one large storage pool which chunks of storage (i.e., logical units or LUs) allocated to each client 114. The VIOSes within the overall system (DPS 100) are now structured as part of the cluster, with each VIOS being a node in the cluster. Each VIOS node communicates with other VIOS nodes utilizing the VIOS protocol. With this configuration of VIOSes, when two or more client LPARs 114 belonging to different CECs 110 share storage on the SAN (e.g., two clients assigned overlapping LUs), the VIOS protocol enables each node to query (each client within the cluster) to determine the current usage of the storage device. When this information is received, the VIOS may then disseminate this information to other VIOSes. Each client is thus made aware of whether the SAN storage device that the client is trying to access is currently being used by some other client.

Figure 4:
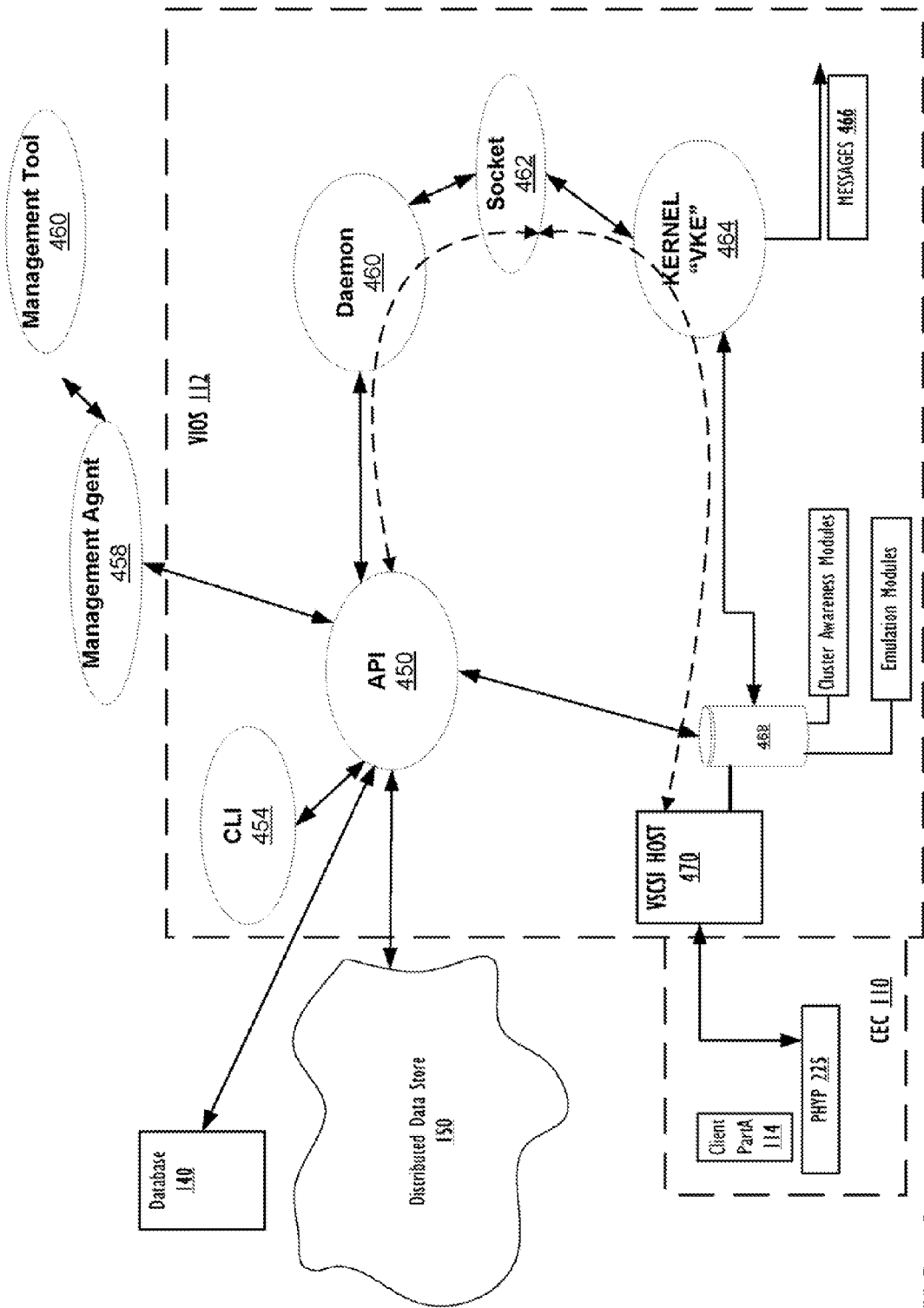
FIG. 4 illustrates a VIOS communication infrastructure with an application programming interface (API) controlling messaging and communication of VIOS components and other devices within the DPS, according to one embodiment.

Referring now to FIG. 4, there is illustrated an example VIOS communication infrastructure having an application programming interface (API) controlling the various exchanges between XML components over a virtual Small Computing Systems Interface (vSCSI) topology. Central to the Cluster/VIOS communication paradigm is a plurality of APIs, of which API 252 is provided in the illustrative embodiment. The VIOS API 450 is utilized to manage objects within a VIOS cluster. The API 450 includes the necessary information about how to connect to and/or exchange information with internal VIOS functional modules as well as with DB 140, DDS 150 and management tool 460. In one embodiment, management tool 260 is implemented within a cluster aware server module and includes server management sub-agents 258, which represents the structures utilized by the managing tool to communicate with the operating system. The internal functional modules within VIOS 112 comprises command line interface (CLI 454), Daemon 460, socket 462, kernel extension (vKE) 464, and vSCSI host 470. The vSCSCI host 470 includes the enhancements to VIOS 112 that enable the cluster aware functionality. These enhancements are illustrated as a connected block structure 468, by which advanced VIOS operations and emulation are provided, as described in greater detail below. VIOS 112 with its various internal components is connected within CEC 110 via PHYP 225, as previously illustrated by FIG. 2, described above.

Each component that connects with API 450 and makes one or more requests through API 450 is generally referred to as a "caller" throughout this specification. As presented by the figure, any one or management tool 460 (via management agent 458), CLI 454, Daemon 460, and vSCSI host 470 may be a caller requesting specific types of information exchange via API 450. In one embodiment, the API 450 comprises an XML interface as well as a C programming language interface. The various "callers" use the VIOS API 450 to initiate actions on these objects. Some actions may change the state of one or more objects in the VIOS cluster. The VIOS API 450 may be used by multiple callers at any given time. While callers are not aware of other callers using the VIOS API 450 and do not have the ability to notify all callers of actions that they initiate, the VIOS API event notification protocol provides cluster level awareness of caller modifications to prevent data contamination during processing of multiple caller requests. Callers that need awareness of actions taken on VIO objects are able to register for event notification and receive notification about changes to VIO objects that occur within the cluster. The callers then utilize the notifications as a trigger to go to the shared storage (DB 140) and retrieve the necessary information from the shared VIOS cluster DB 140 to keep the caller's locally stored VIO object data current. Additionally, in one embodiment, VIOS API event notification provides participating callers with results to actions that have occurred on one or more VIO objects. As described herein, these VIO object events are categorized as Lifecycle events or Alert events.

In one embodiment, to decrease the amount of APIs required be each consumer, only a few high level APIs are exposed. Each API provides various actions on an object by object basis. Interaction between the API 450 and a consumer (a caller receiving data in response to a requestor a caller registered to receive notification of an event) is performed by the consumer providing a VIO request extensible markup language (XML) buffer with sufficient amount of data provided in order for the request to be processed. Once the request has been processed, a VIO response XML steam is written back to the caller for response processing. When the response indicates a successful processing of the request, the XML steam contains the status and the requested object information that is needed. However, if the request fails, the response XML stream contains VIO exception information. The common format of each object API is to provide a vioRequest structure that contains the required information needed for request processing.

Returning to FIG. 4, in the illustrative embodiments, a VIOS 112 emulates SCSI devices using a kernel extension (vscsi host kernel extension kernel extension) in the VIOS partition (which also includes the code/modules for providing VCSI host 470 and Daemon 460). VSCSI host 470 includes one or more driver(s) and sub-driver(s), which provide separate functions. A first set of drivers provides emulation functionality, while other drivers provide transport and messaging functionality. VSCSI host 470 includes VIOS enhanced operational functionality, illustrated via additional structure4 coupled to VSCSI host 470. Structure 468 includes software modules that enable the various messaging structures used for implementing VIOS cluster awareness functionality and VIOS/Client emulation. Client 114a logs into the VIOS 112 as part of the transport layer protocol. At the time the client 114a logs into the VIOS 112, the PHYP 125 provides information to the VIOS 112 regarding the identity (ID) of the client 114a relative to the CEC 110. The VKE 264 services SCSI requests sent by the VIOS 112 through a transport layer supported by PHYP 225. The kernel code does not complete the login request until the VKE 464 sends a message with the CEC-relative client ID using a socket 462 to Daemon 460, which is also running on the VIOS 112. VKE 464 also transmits other messages 466 within the cluster environment. The user daemon 460 has access through API 450 to Database (DB) 140, which is maintained by all VIOS partitions servicing the client(s) within the cluster.

D. VIOS Shared DB for Cluster Management

As described herein, implementation of the cluster awareness with the VIOSes of the cluster enables the VIOSes to provide cluster storage services to virtual clients (114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition. When a virtual target device is removed, the local OS cache (local storage) data entries are deleted. Within the clustered environment, removal of any of the LUs is noticed to the other VIOSes. According to the described method, a distributed device repository and local repository cache are utilized to ensure the nodes within the cluster become device level synchronized from each node (VIOS) in the cluster.

According to one embodiment, information needed to configure a virtual target device (VTD) is stored in DB 140. This database (DB 140) can be accessed by all the nodes in the VIOS cluster, utilizing services provided by Cluster-Aware OS, such as but not limited to Cluster-Aware AIX (CAA). Additionally, certain small levels of cluster data are stored in a local database (ODM) (e.g., virtualized portions of storage 234, FIG. 2) on each node for the devices which exist on that node. This local storage is necessary in order for the processes running on the local node to be able to match the VIOS device with the correct information in the distributed database.

With information about each device being stored in the DB 140, operations on those devices can be performed from any VIOS node in the cluster, not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local node is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

Figure 5:
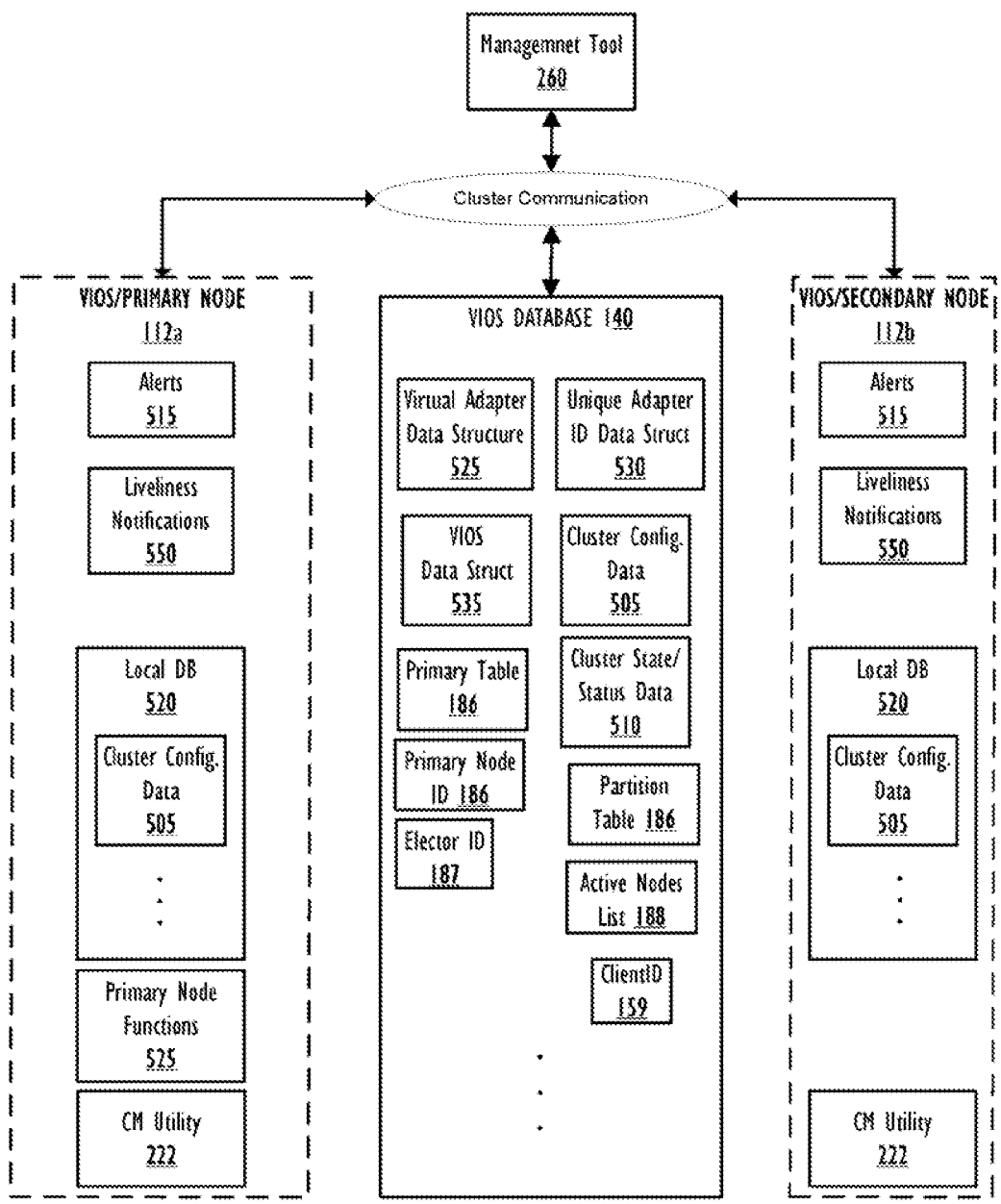
FIG. 5 is a block diagram representation of stored data structures and other functional components within a VIOS DB including primary node election components, which enable cluster level information/data management and exchange between a management tool, a primary node, secondary node and the shared database, according to one embodiment.

FIG. 5 is a block diagram representation of functional components of a primary node, a secondary node and shared storage (DB 140) to enable cluster level information/data storage, management and exchange between the nodes and VIOS shared storage (DB 140). In one embodiment, a local copy of (relevant data of) DB 140 is shared by each VIOS within the cluster and stored in respective local DB 520. Each VIOS is then responsible for storing, maintaining and updating the data structures at DB 140 in one embodiment. As illustrated by FIG. 5, DB 140 is accessible to the various VIOS nodes 112 and to management tool 405 via cluster communication fabric. Database 140 comprises several different modules of data, which may be arranged in a plurality of formats (e.g., tables, raw data, sequenced data, etc.) According to the figure, DB 140 includes a virtual adapter data structure 525, which maintains a listing of and configuration information about the virtual adapters. DB 140 also includes a second data structure 530 that holds the unique adapter identifiers (AdapterIDs), and is therefore referred to herein as AdapterID data structure 530. DB 140 maintains a listing of and information about the VIOSes within a VIOS data structure 535. In one or more embodiments, each of the described data structures 525-535 can be or can include a table within DB 140. When a virtual adapter is first discovered, the cluster management (CM) utility 122 (FIG. 1B) creates a row within the virtual adapter data structure 525 and a row within the unique AdapterID data structure 530. These two rows in the different data structures are associated with each other, and the identifier (ID) is guaranteed to be unique. In one or more embodiments, adapter names are unique per CEC 110, and where VIOS partitions are not "mobile" (i.e., do not move from a first CEC to a second CEC), the adapter names can be identified using a CEC, name tupple. When a VIOS 112 is first configured, the VIOS downloads from DB 140 a copy of cluster configuration data 505 and cluster state/status data 510 from VIOS DB 140. VIOS DB 140 may comprise a plurality of additional data structures and/or components, some of which are illustrated within VIOS DB 140, but are not germane to the description of the embodiments presented herein.

E. Autonomous Propagation of Virtual IO From First to Second VIOS Due to Fabric Loss According to one embodiment, to take advantage of the clustered VIOS configuration whereby multiple VIOSes have access (or can gain access) to a shared block storage (such as the distributed storage repository 150), virtual clients (client LPARs 114) are configured with redundant access to multiple VIOSes. With this ability to provide client LPARs 114 with redundant access to multiple VIOSes, the described embodiments further enable a reduction in I/O errors that would otherwise be caused by a loss of connectivity to the network fabric by any one VIOS supporting I/O operations of a client LPAR 114. Thus, as described in greater detail below, a first VIOS partition that is currently servicing I/O requests from an initiator (client LPAR 114) can propagate I/O resources to other VIOSes within the VIOS cluster, such that a second VIOS can service the I/O request, where backup I/O servicing is needed.

The below described embodiments are implemented within the various configurations of DPS 100 (FIGS. 1-2) having VIOSes 112 of one or more CECs 110 arranged in a VIOS cluster and supporting the I/O operations of the client LPARs located on the one or more CECs 110. As provided herein, the VIOSes are cluster aware and share cluster-level data via VIOS DB 140. Further, the VIOSes 112 provide the VIO operations that enable access to distributed storage repository (storage repository) 150. The various presented embodiments further provide application of management tool (180) functionality and descriptions of the messaging and communication protocols (of the clustered VIOSes 112) that collectively enable cluster-awareness and efficient I/O and storage virtualization and I/O and storage management within the DPS. As is described hereinafter, additional embodiments enable VIO operations to be autonomously propagated from a first VIOS to a second VIOS of the VIOS cluster following a fabric loss of the client-assigned (first) VIOS handling the VIO for the client LPAR. These embodiments are supported/provided by additional functionalities of (i.e., encoded within) the CA_OS 220 and/or specifically CM utility 222.

In one embodiment, CM utility 222 is executed by virtual processing resources of VIOS 112 to provide a method for enabling the various I/O redundancy features and functionality described by the below presented embodiments. Among the method functions performed/provided by execution of the I/O redundancy module/code of the CM utility 222 are the following non-exclusive functions: (a) a first VIOS receiving an I/O request from the client LPAR; (b) detecting that a problem exists with a fabric connection to the block storage; and (c) autonomously propagating the I/O request to a second VIOS to which the first VIOS is connected within the VIOS cluster, wherein forwarding of the I/O request to the block storage is completed by the second VIOS.

Figure 6:
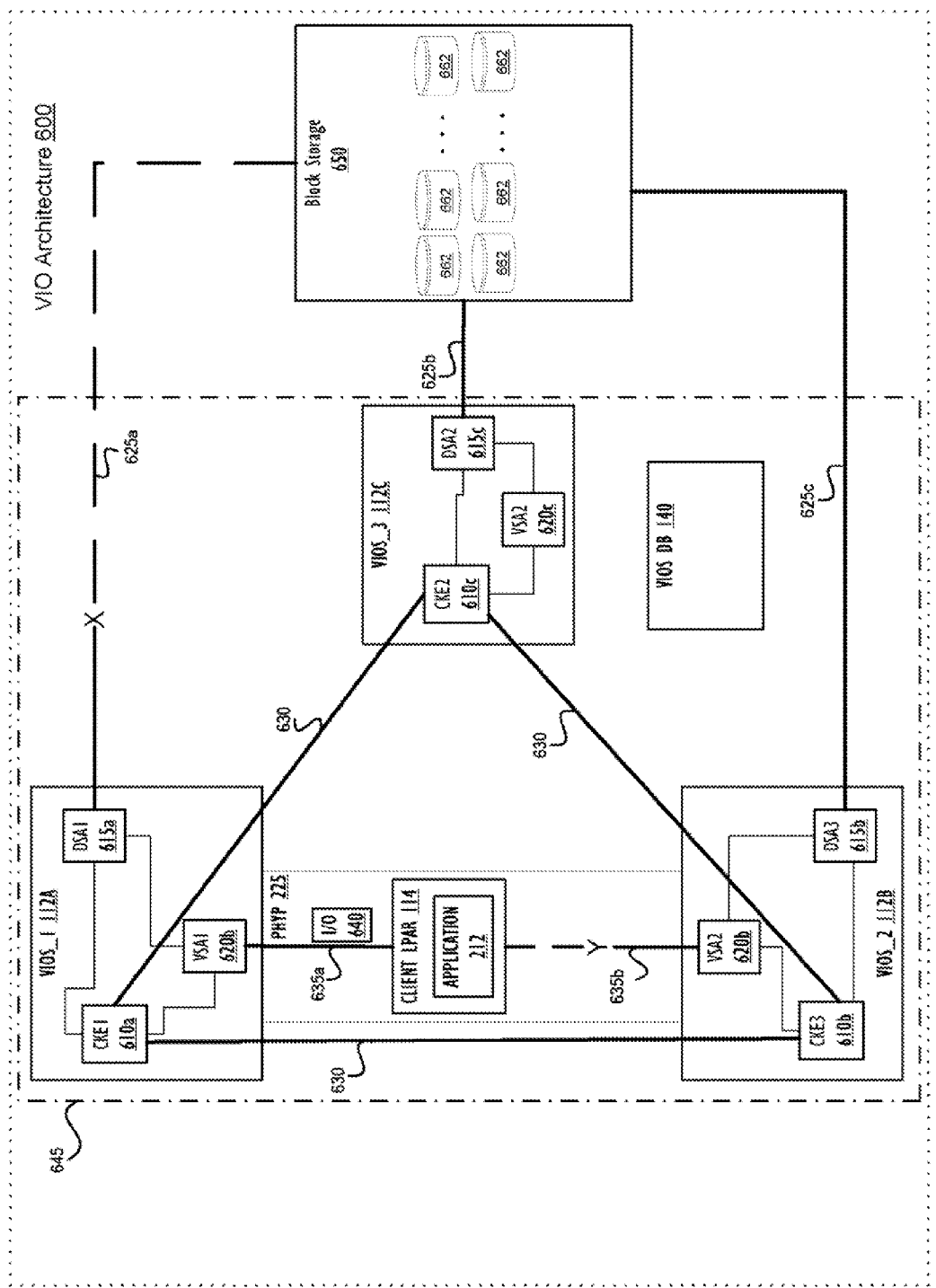
FIG. 6 is a block diagram representation of a cluster aware VIOS architecture that provides redundancy in VIO operations of a client logical partition (LPAR) due to a connectivity failure of a first VIOS assigned to the client LPAR, according to one embodiment.

Turning now to FIG. 6, there is illustrated a block diagram representation of the interconnectivity between VIOSes within an example VIOS cluster and between the VIOSes and shared block storage 650. Specifically, FIG. 6 provides a graphical representation of the method by which a first VIOS (112A) that is assigned to provide I/O operations for a client LPAR (114) responds to a loss of connectivity with the block storage facility 650, according to one embodiment. As utilized within the various embodiments, block storage 650 (or block storage facility) represents any type of storage that is generally accessible from any one of multiple VIOSes within a VIOS cluster. This, block storage 650 may be the distributed storage repository 150, other network accessible storage, or local storage (e.g., storage 234 of FIG. 2). When block storage 450 is distributed storage repository 150, block storage may be a SAN or NAS, in one embodiment.

As illustrated by FIG. 6, virtual I/O (VIO) architecture 600 comprises three interconnected VIOSes, VIOS1 112A, VIOS2 112B and VIOS3 112C. Each VIOS 112 connects to block storage 650 via respective system-level storage interconnect fabric 625a, 625b, and 625c. While illustrated as a single interconnect, the connection between the VIOSes and block storage 650 is generally referred to herein as a storage interconnect fabric 625 since the actual connection may be a complex switch or network of wires. It is further appreciated that one or more communication hops within storage interconnect fabric 625 can be a wireless connection. The term fabric loss thus refers to any type of degradation or stoppage in the ability of a VIOS 112 to transmit (or receive) data over any portion of storage interconnect fabric 625 to/from block storage 650. The actual type of fabric loss (at the storage level) does not directly affect the redundancy methodology being described herein.

Each of VIOS1 112A (first VIOS), VIOS2 112B (second VIOS) and VIOS3 112C (third VIOS) is interconnected via intra-cluster interconnect fabric 630, which connects each VIOS (e.g, VIOS_A 112A) with one or more other VIOSes (e.g., VIOS 112B and 112C) within to create the VIOS cluster 645. VIOS Cluster 645 also comprises VIOS DB 140 to which each VIOS 112 within the cluster is connected (via respective cluster-level interconnect fabric, which are not specifically shown). Notably, within the described embodiments, the second and/or third VIOSes (112b/112c) can exist on the same CEC or a different CEC within the cluster from the first VIOS 112a.

Each VIOS 112A, 112B, 112C includes internal software structures within respective software stacks by which the VIOSes 112A, 112B, 112C are able to communicate with each other as well as with VIOS DB 140 and distributed storage repository 150. For example, illustrated within first VIOS 112A are the following software structures, without limitation: (1) cluster kernel extension (CKE) 610a, which is a kernel extension that allows the each VIOS (e.g., first VIOS 112A) to communicate with other VIOS nodes (e.g., second VIOS 112B) within the VIOS cluster 645; (2) distributed storage access (DSA) 615a, which is also a virtual interface that monitors the connectivity of a storage fabric from the VIOS; and (3) virtual server adapter (VSA) 620a, which is the virtualized I/O adapter that the VIOS assigns to a specific client to communicate I/O requests between the client LPAR 114 and the assigned VIOS(es). During I/O redundancy operation, VSA 620 handles the communication of the I/O request from the client and the communication of I/O response to the client. DSA 615 checks the connection status of the storage interconnect 625 of the VIOS and signals CKE when a fabric loss condition is detected on the interconnect 625. CKE 610 handles the propagation of the I/O request to another VIOS when a fabric loss condition is detected by DSA and is communicated by DSA 615 to CKE 610. The additional functionality associated with and/or manner of usage of the above set of software structures are presented in detail below.

FIG. 6 also illustrates an example client LPAR 114 on which an application 212 executes to generate example I/O operations for completion within the distributed storage repository 150. Shown beneath client LPAR 114 is virtualization management component (represented as PHYP 225). As described above, communication between client LPAR 114 and VIOS 112a occurs via PHYP 225 operating as the emulation layer facilitation exchange between the two virtual partitions. Client LPAR 114 is illustrated with connectivity 635 (enabled via software) to first VIOS 112A and third VIOS 112C. In this context, first VIOS 112A is the primary VIOS assigned to client LPAR 114 and first VIOS 112A normally handles most I/O operations originating from or directed towards client LPAR 114. Thus, while first VIOS 112A is functional and communicatively connected to distributed storage repository 150, client LPAR 114 (operating as the initiator of an I/O operation) communicates desired I/O operations 640 to/through first VIOS 112A via virtualization management component (presented as PHYP 225, in the illustrative embodiments). First VIOS 112A then completes the I/O operations on behalf of client LPAR 114 by forwarding the I/O request to block storage 150 (the target of the I/O operation) if there is no storage fabric loss condition detected on storage interconnect fabric 625a. In this scenario, the I/O requests are forwarded over storage interconnect fabric 625a. Likewise, I/O response (data or instructions, etc.) returned from distributed storage repository 150 are routed via storage interconnect fabric 625a from block storage 650 to first VIOS 112A, and first VIOS 112A then routes the I/O information received to client LPAR 114 via pHYP 225.

As shown by FIG. 6, the communication path 635b between client LPAR 114 and second VIOS 112A has been degraded (perhaps due to internal software/hardware issues) and is currently unusable for the client's storage software stack. The path 635a through between client LPAR 114 and VSA1 620a (of VIOS1 112A) is available. However the physical connection (via storage interconnect 625a) to the block storage 650 has been degraded as VIOS1 112a is no longer connected to the block storage 650. With this scenario, in a non-clustered environment, the client LPAR 114 could potentially crash as all paths to the physical storage have been degraded. However, as provided within the clustered environment, with cluster-aware VIOSes, a new multi-path I/O (MPIO) solution is provided, and the I/O requests from client LPAR 114a is propagated to other VIOS nodes within the cluster for I/O processing. In the illustrative example, the I/O requests 640 sent from client LPAR 114 to VIOS1 112A is forwarded to CKE1 610a from VSA1 620a, and CKE1 610a forwards the I/O request 640 to CKE2 610b of the second VIOS 112B. CKE2 610b in turn sends the I/O request onward to the block storage 650. The described embodiments thus provide a cluster level of redundancy, which supports increased system availability and reliability within the clustered system when unforeseen hardware/software issues arise.

As further illustrated by FIG. 6, when a fabric loss condition occurs that results in a loss of communication between the first VIOS 112A that is assigned to provide I/O service to the client LPAR 114, the first VIOS 112A detects the loss of (or significant degradation in) connectivity at/on the storage interconnect fabric 635a between the first VIOS 112A and distributed storage repository 150. For illustrative purposes, a loss of VIOS connectivity (or access) to the distributed storage repository 150 is described as loss of physical connection (or connectivity) to the distributed storage repository 150, and is illustrated with an "X" marking a premature termination of the specific interconnect (625a). This fabric loss of connectivity is further illustrated and indicated by the presence of dashed lines. Thus, in contrast, the presence of solid connecting lines indicates the existence of a good connection between connected devices, as with second storage interconnect fabric 625b and third storage interconnect fabric 625c.

The presently described embodiments focus primarily on a physical fabric loss (X). However, alternate embodiments contemplate situations in which the first VIOS 112A itself fails or has an internal error condition that prevents the first VIOS 112A from being able to provide/fulfill the I/O operations to/of the client LPAR 114. In this scenario, the loss may be software related, and one such loss is illustrated within FIG. 6 with a "Y" marking an in ability to communicate I/O operations from/to the client LPAR 114. In another embodiment, a third type of fabric loss, which is a loss of VIOS fabric connection to/with VIOS DB 140 may also be addressed by providing VIOS enabled backup redundancy.

The various embodiments provide implementation of VIO redundancy to support autonomous propagation of I/O operations to other VIOSes within a VIOS cluster in order to substantially reduce the occurrence of I/O errors due to fabric loss. According to the various embodiments, at least one physical communication interconnect is present between each member within the cluster. In some embodiments, I/O redundancy is further provided by implementing multiple communication interconnects between components such that the delivery of VIOS communication between two CKEs (e.g., CKE1 610a and CKE2 610b) increases the likelihood of cluster communication when one communication path may be down, degraded, or unusable.

F. VIOS Creation and Registration with VIOS Cluster

Figure 7A:
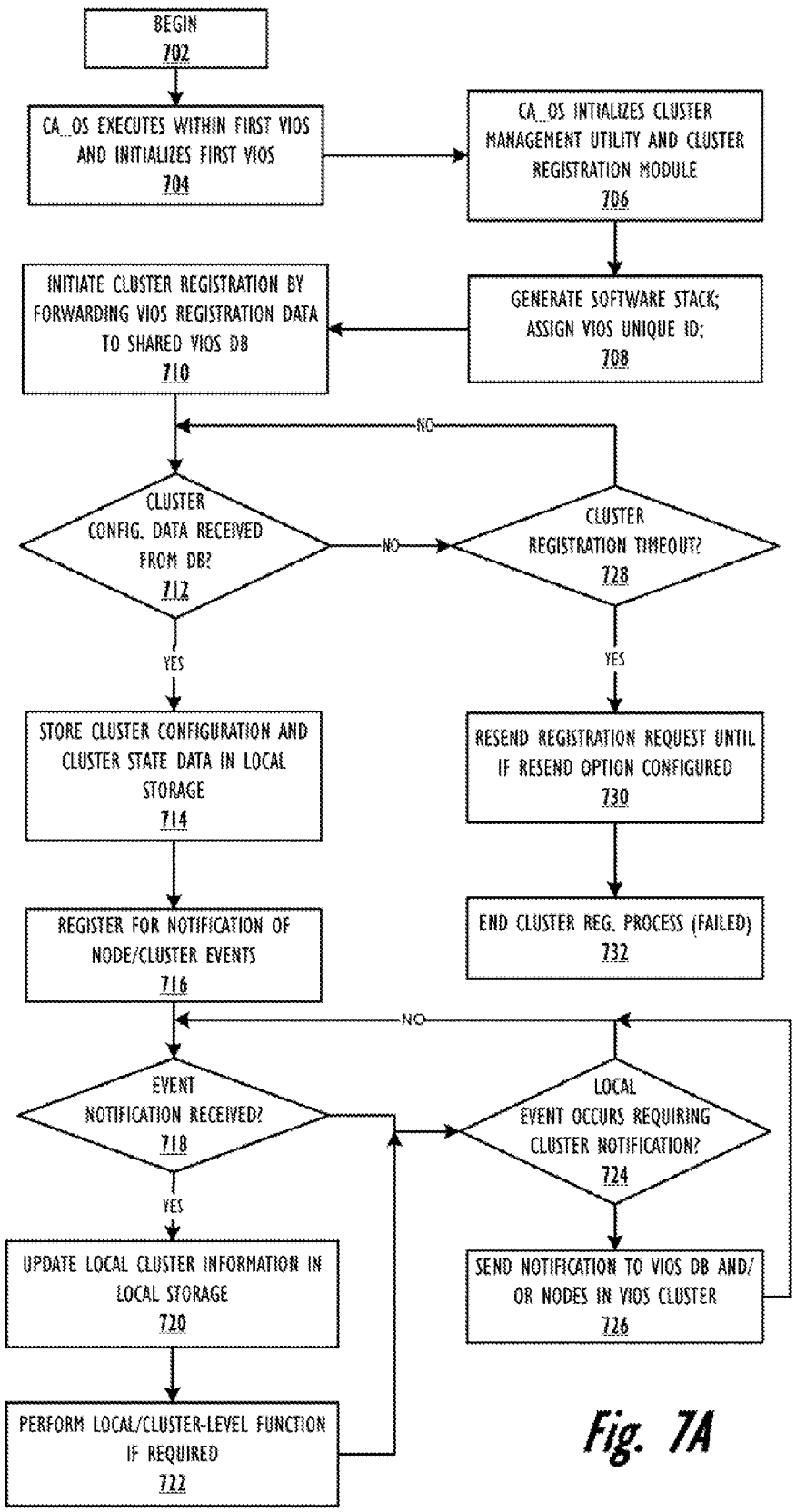
FIG. 7A is an example high-level logical flowchart illustrating the method of creating a cluster-aware VIOS and registering the cluster-aware VIOS with the VIOS cluster, according to one or more embodiments.
Figure 7B:
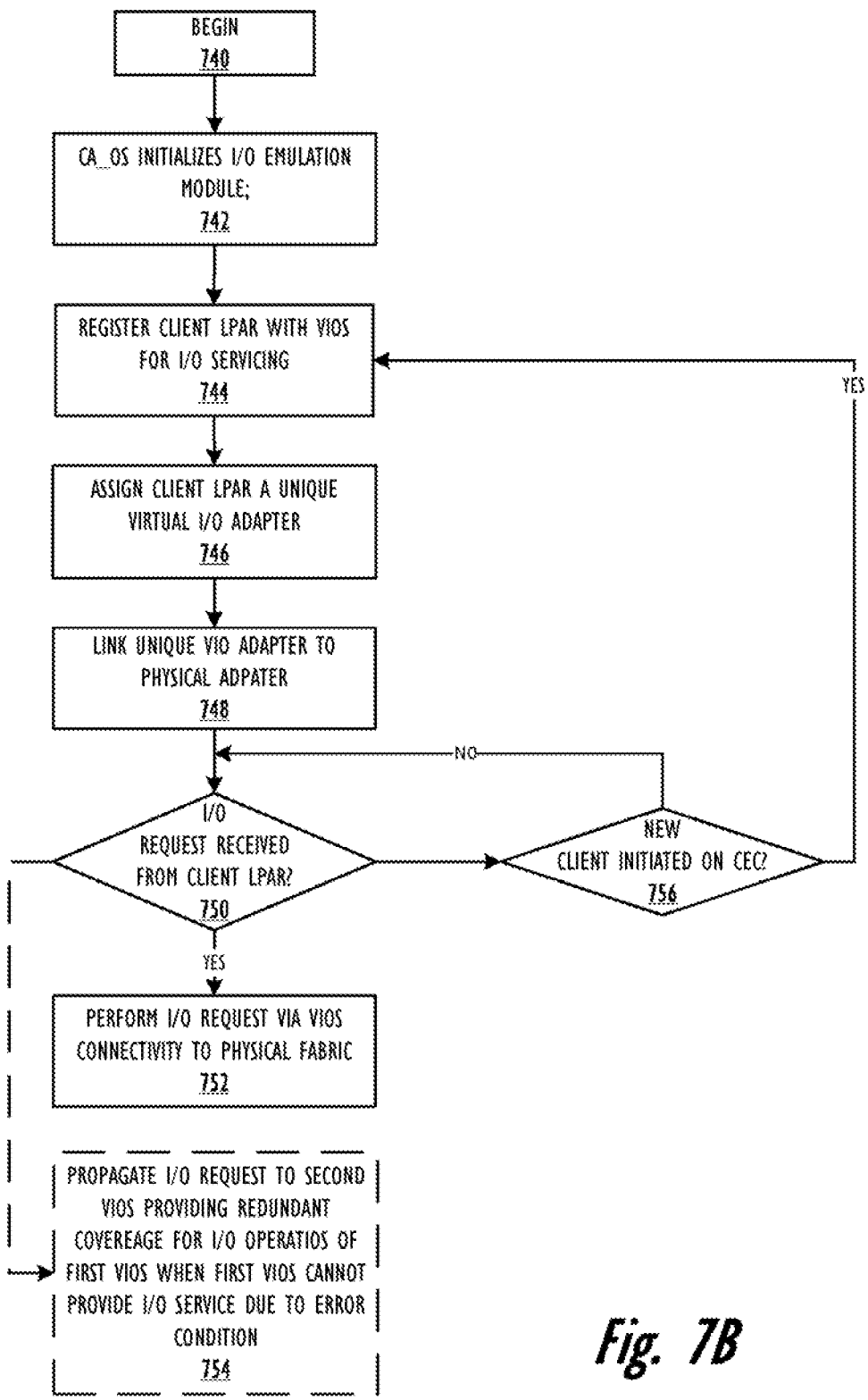
FIG. 7B is a high-level logical flowchart of an exemplary method by which several functional aspects of a cluster-aware VIOS are provided, according to one or more embodiments.

FIGS. 7A and 7B are flow charts illustrating one or more methods by which the above introduced processes of the illustrative embodiments are completed. Although the methods illustrated by FIGS. 7A and 7B may be described with reference to components and functionality illustrated by and described in reference to FIGS. 1-6, it should be understood that this is merely for convenience and alternative components and/or configurations thereof can be employed when implementing the various methods. Certain portions of the methods may be completed by CA_OS 220 and/or CM utility 222 executing on one or more (virtual) processors (CPU 206A) within VIOS 112 (FIG. 1 or 2). The executed processes then control specific operations of or on CECs 110, VIOSes 112, and DB 140 (and distributed storage repository 150, in some embodiments) For simplicity in describing the methods, all method processes are described from the perspective of CA_OS 220, CM utility 222 and/or CA VIOS 112.

Referring now to FIG. 7A, there is illustrated a high level logical flowchart of the method by which a fabric loss condition for a VIOS I/O operation is handled within the cluster-aware VIOS infrastructure. The method begins at block 702 and proceeds to block 704 at which a cluster aware (CA) operating system (OS) executing on a processor resource within the first VIOS partition initializes the first VIOS for VIO functionality. At block 706, the CA_OS initializes the cluster management utility and the cluster registration utility. CA_OS generates a software stack and assigns a unique ID to the VIOS (block 708). CA-OS 220 (or CM utility 222) initiates registration of the VIOS with the VIOS forwarding VIOS registration data to the shared VIOS DB 140. Registration with the VIOS DB 140 triggers the VIOS DB to return cluster configuration information and enables the first VIOS to receive cluster specific data to make the first VIOS aware of the VIOS cluster. Once the first VIOS receives the information, the first VIOS is made cluster-aware and is able to communicate information with other VIOSes within the VIOS cluster. At decision block 712, CA_OS determines whether the cluster configuration data and cluster state/status data have been received from the VIOS DB 140. When the cluster data is not received within a pre-established timeout period (as determined at decision block 728), the registration information is resent (block 730) and the initial registration process ends with an initial failure (block 732). The CA_OS waits until the timeout period expires before resending the registration request, and the number of registration retries is a design parameter that is variable.

Returning to decision block 712, in response to receiving the configuration data from the VIOS DB, the CA_OS stores the cluster configuration and cluster state/status data within a local storage of the first VIOS (block 714). CM utility 222 then registers VIOS with the VIOS DB for one or more event notifications (of cluster events and/or other node events) (block 716). When cluster (or other node) event notifications are received by VIOS, as determined at block 718, the CM utility 220 updates the local cluster information within the local storage of the VIOS with relevant changes to the cluster information (block 720). The CM utility 222 then initiates performance of any responsive cluster level functions based on the received event notifications (block 722). As an example, in one embodiment, when the notification indicates that the primary node of the cluster has relegated from its primary node position, the CM utility 222 may initiate a primary node election module which performs the primary node election process with the other nodes in the VIOS cluster. When a local event occurs at the first node that requires cluster notification, as determined at decision block 724, CM utility 222 sends a notification of the local event to the VIOS cluster (i.e., to the VIOS DB and/or to the other nodes within the VIOS cluster) (block 726).

Turning now to FIG. 7B, there is illustrated the method by which various ones of the I/O functions of the CA VIOS are implemented. The method begins at block 740 and proceeds to block 742 at which CA_OS initializes the I/O emulation module of the first VIOS. The I/O emulation module enables the VIOS to provide virtual I/O (VIO) services to one or more client logical partitions (LPARs) existing within one or more of the OS partitions within the CEC. The client LPAR is registered with the VIOS (block 744) and is assigned a unique VIO adapter for I/O processing (block 746). The CA_OS then links the unique VIO adapter to a physical adapter (block 748). In one or more embodiments, this linking actually only occurs at the time the VOS processes an I/O request from the client LPAR. When an I/O request is received from the client LPAR as determined at decision block 750, the I/O request is processed by the VIOS utilizing the VIO adapter and connectivity via the physical I/O adapters to the connecting fabric (block 752). As provided at decision block 756, if a new client LPAR is initiated on the CEC and requires VIO services from the VIOS, the process of registering a client to the VIOS is repeated for the new client LPAR. As also indicated by the dashed (optional) block 754, the CA_OS also enables the VIOS to propagate I/O requests to a second VIOS providing redundant I/O coverage to the first VIOS when the first VIOS cannot complete the I/O request for the registered client LPAR. As described above with reference to FIG. 6, this scenario may occur when the VIOS detects that a problem exists with a fabric connection to the block storage.

Certain of the above processes of FIGS. 7A and 7B are implemented within a computer program product comprising: a computer readable storage medium; and program code for completing these functions stored on said computer readable storage medium.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computing electronic complex (CEC) comprising:
   a processor;
   one or more physical input/output (I/O) adapters that support I/O communication with an external network; and
   a memory coupled to the one or more processors, wherein the memory includes:
   a virtualization management component that supports creation of and communication between one or more virtualized operating system (OS) partitions;
   at least one operating system (OS) partition, including a first virtual input/output (I/O) server (VIOS) having a cluster-aware operating system (CA OS) that executes on a virtual processor resource of the first VIOS to:
      assign the first VIOS with a unique ID;
      send a VIOS registration data of the first VIOS to a shared VIOS database (DB) to register the first VIOS with a VIOS cluster comprising one or more other VIOSes including at least a second VIOS, wherein the VIOS DB is separated from the CEC via a physical network fabric;
      in response to sending the VIOS registration data to the shared VIOS DB, receive, from the shared VIOS DB, cluster configuration data and status data of the VIOS cluster for local storage at the first VIOS, wherein the cluster configuration information data and status data makes the first VIOS aware of the VIOS cluster and one or more other VIOSes within the VIOS cluster and enables the first VIOS to communicate information with the one or more other VIOSes within the VIOS cluster; and
      in response to not receiving the cluster configuration data and status data within a pre-established timeout period, resend, to the shared VIOS DB, the VIOS registration data to register the first VIOS with the VIOS cluster, wherein the VIOS registration data is resent up to a predetermined number of times specified by a variable design parameter;
   wherein the first VIOS and the one or more other VIOSes share cluster-level data via the VIOS DB.

2. The computing electronic complex of claim 1, wherein the CA_OS further enables the first VIOS to:
   initialize a cluster registration module of the CA_OS to generate a software stack for the first VIOS; and
   update the local storage of the first VIOS with the received cluster configuration data and status data.

3. The computing electronic complex of claim 1, wherein the CA_OS further enables the first VIOS to:
   initialize an I/O emulation module of the CA_OS to enable the first VIOS to provide virtual I/O (VIO) services to one or more client logical partitions (LPARs) existing within one of the OS partitions;
   register a first client LPAR with the first VIOS;
   assign a unique VIO adapter to the client LPAR; and
   enable I/O operations for the client LPAR by linking the unique VIO adapter to one of one or more physical I/O adapters.

4. The computing electronic complex of claim 1, wherein the CA_OS comprises a cluster management (CM) utility that executes on the virtual processor resource to:
   register the first VIOS with the VIOS DB for receipt of one or more notifications of one or more events that may occur in the VIOS cluster;
   receive events data from within the VIOS cluster; and
   update the local storage of the first VIOS with relevant cluster information for the first VIOS.

5. The computing electronic complex of claim 4, wherein the CM utility is further configured to coordinate a primary node election process with the one or more other VIOSes within the VIOS cluster to elect a primary node from among the VIOSes within the VIOS cluster, wherein the primary node performs one or more primary node functions of the VIOS cluster.

6. The computing electronic complex of claim 1, wherein the CA_OS further enables the first VIOS to provide virtual I/O (VIO) connectivity to a physical fabric connecting the first VIOS to a block storage, wherein the block storage is accessible by all VIOSes within the VIOS cluster.

7. The computing electronic complex of claim 3, wherein the CA_OS comprises a cluster management utility that executes on the virtual processor resource to:
provide I/O redundancy within the VIOS cluster by enabling the first VIOS to perform the functions of:
receive an I/O request from the client LPAR;
detect that a problem exists with a fabric connection to a block storage that is accessible by all VIOSes within the VIOS cluster;
autonomously propagate the I/O request to a second VIOS to which the first VIOS is connected within the VIOS cluster, wherein forwarding of the I/O request to the block storage is completed by the second VIOS; and
in response to receiving an I/O response from the second VIOS:
associate the I/O response to the I/O request that was propagated to the second VIOS; and
forward the I/O response to the client LPAR of the first VIOS.

8. The computing electronic complex of claim 1, wherein the CA_OS further enables the first VIOS to generate a software stack within the first VIOS to enable the first VIOS to communicate with components external to the first VIOS via an application programming interface.

9. The computing electronic complex (CEC) of claim 1, wherein the CA_OS further enables the first VIOS to: create the VIOS cluster with the first VIOS and one or more second VIOSes located within the CEC, where each VIOS within the VIOS cluster is communicatively coupled to each other VIOS within the VIOS cluster and has access to the VIOS DB.

10. A data processing system (DPS) comprising:
a plurality of computing electronic complexes including the computing electronic complex (CEC) of claim 1;
a distributed storage repository that is accessible from each CEC of the plurality of CECs and by each virtual input/output (I/O) server (VIOS) operating within each CEC;
a VIOS database (DB) separated from the each of the plurality of CECs via one or more network fabrics, wherein the each VIOS operating within each CEC shares cluster-level data via the VIOS DB;
wherein the first VIOS is physically located on a first CEC while the second VIOS is physically located on a second CEC of the DPS; and
wherein the first VIOS and the second VIOS each comprise a virtual processor executing respective CA_OSes, are both a node within the VIOS cluster, and are both cluster-aware.

11. In a data processing system having: a processor, a memory coupled to the processor, at least one input/output (I/O) adapter that enables connection to an external network, a virtualization management component executing within the data processing system, and a plurality of operating system (OS) partitions including a first virtual I/O server (VIOS) partition, a method comprising:
a cluster aware operating system (CA_OS) executing on a processor resource within the first VIOS partition to perform the functions of:
assigning the first VIOS with a unique ID;
sending a VIOS registration data of the first VIOS to a shared VIOS database (DB) to register the first VIOS with a VIOS cluster comprising one or more other VIOSes including at least a second VIOS, wherein the VIOS DB is separated from the CEC via a physical network fabric,
in response to sending the VIOS registration data to the shared VIOS DB, receiving, from the shared VIOS DB, cluster configuration data and status data of the VIOS cluster for local storage at the first VIOS, wherein the cluster configuration information data and status data makes the first VIOS aware of the VIOS cluster and one or more other VIOSes within the VIOS cluster and enables the first VIOS to communicate information with the one or more other VIOSes within the VIOS cluster; and
in response to not receiving the cluster configuration data and status data within a pre-established timeout period, resending, to the shared VIOS DB, the VIOS registration data to register the first VIOS with the VIOS cluster, wherein the VIOS registration data is resent up to a predetermined number of times specified by a variable design parameter;
wherein the first VIOS and the one or more other VIOSes share cluster-level data via the VIOS DB.

12. The method of claim 11, further comprising:
initializing a cluster registration module of the CA_OS to generate a software stack for the first VIOS; and
updating the local storage of the first VIOS with the received cluster configuration data and status data.

13. The method of claim 11, further comprising:
initializing an I/O emulation module of the CA_OS to enable the first VIOS to provide virtual I/O (VIO) services to one or more client logical partitions (LPARs) existing within one of the OS partitions;
registering a first client LPAR with the first VIOS;
assigning a unique VIO adapter to the client LPAR; and
enabling I/O operations for the client LPAR by linking the unique VIO adapter to one of one or more physical I/O adapters.

14. The method of claim 11, further comprising:
registering the first VIOS with the VIOS DB for receipt of one or more notifications of one or more events that may occur in the VIOS cluster;
receiving events data from within the VIOS cluster; and
updating the local storage of the first VIOS with relevant cluster information for the first VIOS.

15. The method of claim 14, further comprising coordinating a primary node election process with the one or more other VIOSes within the VIOS cluster to elect a primary node from among the VIOSes within the VIOS cluster, wherein the primary node performs one or more primary node functions of the VIOS cluster.

16. The method of claim 15, further comprising:
providing I/O redundancy within the VIOS cluster by enabling the first VIOS to perform the functions of:
receiving an I/O request from the client LPAR;
detecting that a problem exists with a fabric connection to a block storage that is accessible by all VIOSes within the VIOS cluster;
autonomously propagating the I/O request to a second VIOS to which the first VIOS is connected within the VIOS cluster, wherein forwarding of the I/O request to the block storage is completed by the second VIOS; and in response to receiving an I/O response from the second VIOS:
associating the I/O response to the I/O request that was propagated to the second VIOS; and
forwarding the I/O response to the client LPAR of the first VIOS.

17. The method of claim 11, further comprising:
generating a software stack within the first VIOS to enable the first VIOS to communicate with components external to the first VIOS via an application programming interface; and
enabling the first VIOS to provide virtual I/O (VIO) connectivity to a physical fabric connecting the first VIOS to a block storage that is accessible by all VIOSes within the VIOS cluster.

18. The method of claim 11, further comprising creating the VIOS cluster with the first VIOS and one or more second VIOSes located within the CEC, where each VIOS within the VIOS cluster is communicatively coupled to each other VIOS within the VIOS cluster and has access to the VIOS DB.

19. A computer program product comprising:
a non-transitory computer readable storage medium; and
program code on said non-transitory computer readable storage medium that when executed by a processor within a data processing system performs the functions of initializing, within an operating system (OS) partition of a virtualized processing environment having one or more operating system (OS) partitions, a first virtual input/output (I/O) server (VIOS); and executing a cluster aware operating system (CA_OS) on a processor resource within the first VIOS partition to perform the functions of:
assigning the first VIOS with a unique ID;
sending a VIOS registration data of the first VIOS to a shared VIOS database (DB) to register of the first VIOS with a VIOS cluster comprising one or more other VIOSes including at least a second VIOS, wherein the VIOS DB is separated from the CEC via a physical network fabric;
in response to sending the VIOS registration data to the shared VIOS DB, receiving, from the shared VIOS DB, cluster configuration data and status data of the VIOS cluster for local storage at the first VIOS, wherein the cluster configuration information data and status data makes the first VIOS aware of the VIOS cluster and one or more other VIOSes within the VIOS cluster and enables the first VIOS to communicate information with the one or more other VIOSes within the VIOS cluster; and
in response to not receiving the cluster configuration data and status data within a pre-established timeout period, resending, to the shared VIOS DB, the VIOS registration data to register the first VIOS with the VIOS cluster, wherein the VIOS registration data is resent up to a predetermined number of times specified by a variable design parameter;
wherein the first VIOS and the one or more other VIOSes share cluster-level data via VIOS DB.

20. The computer program product of claim 19, said program code that performs the registering of the first VIOS with the VIOS cluster comprises code that executes to perform the following function:
initializing a cluster registration module of the CA_OS to generate a software stack for the first VIOS; and
updating the local storage of the first VIOS with the received cluster configuration data and status data.

21. The computer program product of claim 19, wherein said program code comprises code that executes to perform the functions of:
initializing an I/O emulation module of the first CA_OS to enable the VIOS to provide virtual I/O (VIO) services to one or more client logical partitions (LPARs) existing within one of the OS partitions;
registering a first client LPAR with the first VIOS;
assigning a unique VIO adapter to the client LPAR; and
enabling I/O operations for the client LPAR by linking the unique VIO adapter to one of the one or more physical I/O adapters.

22. The computer program product of claim 19, wherein said program code comprises code that executes to perform the functions of:
registering the first VIOS with the VIOS DB for receipt of one or more notifications of one or more events that may occur in the VIOS cluster;
receiving events data from within the VIOS cluster; and
updating the local storage of the first VIOS with relevant cluster information for the first VIOS.

23. The computer program product of claim 19, wherein said program code comprises code that executes to perform the functions of:
creating the VIOS cluster with the first VIOS and one or more second VIOSes located within the CEC, where each VIOS within the VIOS cluster is communicatively coupled to each other VIOS within the VIOS cluster and has access to the VIOS DB; and
coordinating a primary node election process with the one or more other VIOSes within the VIOS cluster to elect a primary node from among the VIOSes within the VIOS cluster, wherein the primary node performs one or more primary node functions of the VIOS cluster.

24. The computer program product of claim 19, wherein said program code comprises code that executes to perform the functions of:
providing I/O redundancy within the VIOS cluster by enabling the first VIOS to perform the functions of:
receiving an I/O request from the client LPAR;
detecting that a problem exists with a fabric connection to a block storage that is accessible by all VIOSes within the VIOS cluster;
autonomously propagating the I/O request to a second VIOS to which the first VIOS is connected within the VIOS cluster, wherein forwarding of the I/O request to the block storage is completed by the second VIOS; and
in response to receiving an I/O response from the second VIOS:
associating the I/O response to the I/O request that was propagated to the second VIOS; and
forwarding the I/O response to the client LPAR of the first VIOS.

25. The computer program product of claim 19, wherein said program code comprises code that executes to perform the functions of:
generating a software stack within the first VIOS to enable the first VIOS to communicate with components external to the first VIOS via an application programming interface; and
enabling the first VIOS to provide virtual I/O (VIO) connectivity to a physical fabric connecting the first VIOS to a block storage that is accessible by all VIOSes within the VIOS cluster.

* * * * *